Jan. 8, 1929.                              1,698,611
L. R. TEAGUE ET AL
CULTIVATOR SHIELD HOLDER
Filed July 13, 1927
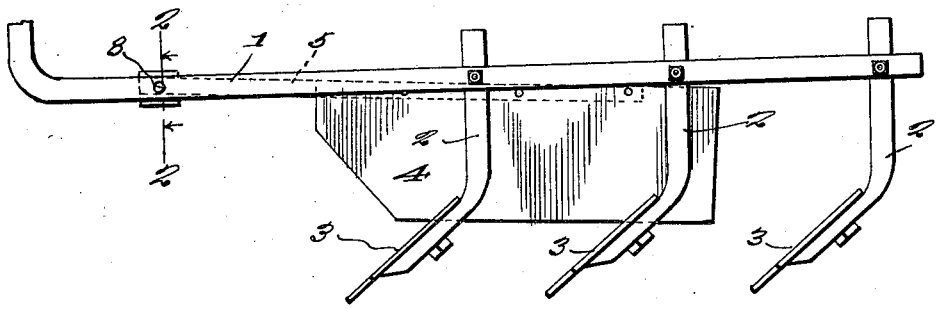
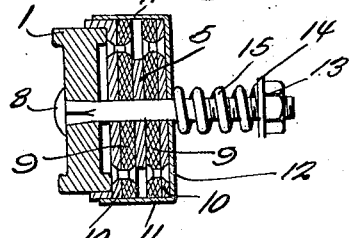
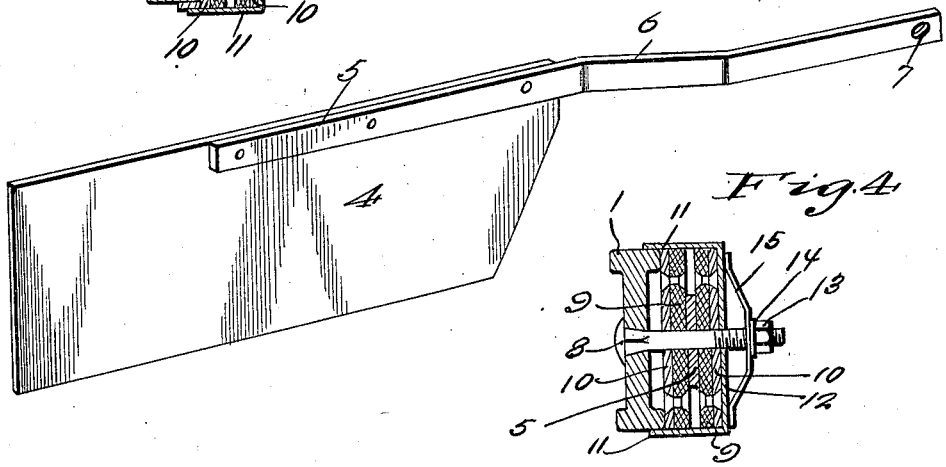
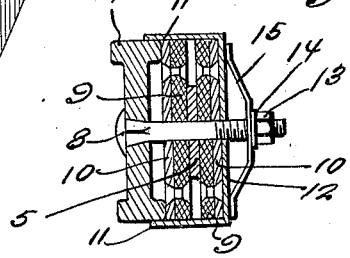
Lee Roy Teague
James Graybill  INVENTOR
BY Victor J. Evans
ATTORNEY
WITNESS:

Patented Jan. 8, 1929.

1,698,611

UNITED STATES PATENT OFFICE.

LEE ROY TEAGUE AND JAMES GRAYBILL, OF LOGAN, IOWA.

CULTIVATOR-SHIELD HOLDER.

Application filed July 13, 1927. Serial No. 205,456

Our present invention has reference to cultivators, and is especially directed to a simple, novel and efficient means for connecting and adjustably supporting a shield on such cultivators.

A further object is the provision of pivotal means for associating the arm of a shield with a beam of a cultivator that includes both friction and spring means for sustaining the arm, and consequently the shield adjustable at desired angles on the cultivator beam and with respect to the shovels carried thereby, and which further provides means for limiting the swinging of such arms.

To the attainment of the foregoing and other objects which will present themselves as the nature of the invention is more fully disclosed, the improvement resides in the novel construction, combination and operative association of parts, satisfactory embodiment of which are illustrated by the accompanying drawings.

In the drawings,

Figure 1 is a side elevation of a cultivator provided with the improvement.

Figure 2 is a sectional view on the line 2—2 of Figure 1.

Figure 3 is a perspective view of a shield.

Figure 4 is a sectional view similar to Figure 2, but illustrating a slight modification.

The beam of an ordinary cultivator is, in the drawings, indicated by the numeral 1, the standards by the numerals 2 and the shovels by the numerals 3. The beam is of the usual channeled construction.

The shield comprises the usual plate 4 which, in the present instance has riveted or otherwise fixed at its upper edge on one of its sides a bar 5, which I shall refer to as an arm. The arm has an offset portion 6 and has its outer end provided with a pivot opening 7.

Passing transversely thru the beam 1 adjacent to the front thereof there is a pivot bolt 8. The bolt has a squared portion to hold the same from turning, and this bolt passes thru the opening 7 in the arm 5.

Received on the pivot bolt 8 and in contact with the opposite sides of the arm 5 there are friction plates 9 which are riveted or otherwise secured to outer metal plates 10. The plates 10, as well as the top and bottom edges of the beam 1 are contacted by the parallel flanges 11 on a cross sectionally U-shaped clip 12, thru which the pivot bolt 8 also passes. The bolt 8 has screwed on its outer end a nut 13, and this nut may contact with a washer 14. The washer in turn contacts with a spring 15 that surrounds the bolt and exerts a tension between the washer and the clip 12. The spring may be coiled as disclosed by Figure 2 of the drawings or the said spring may be in the nature of a curved plate as disclosed by Figure 4 of the drawings.

The offset or angular portion 6 of the arm 5 arranges the shield a proper distance away from the beam 1. The frictional engagement exerted by the members 9 and the springs 15 against the arm holds the latter from free turning, but the said arm may be swung on the pivot bolt either by the hand or foot of the operator of the cultivator. When the device is attached to riding cultivators the offset portion 6 of the arm is conveniently located with respect to the driver of the machine, so that the shield may be thus either raised or lowered. As stated the friction means hold the shield adjusted, and the simplicity of the construction and the advantages thereof will, it is thought be understood and appreciated by those skilled in the art to which the invention relates so that further description will not be required. Obviously we do not wish to be restricted to the precise details of construction herein set forth, and therefore hold ourselves entitled to make such changes therefrom as fairly fall within the scope of what we claim.

What is claimed is:—

1. The combination with a cultivator and a shield having an offset arm which is pivoted to the beam of the cultivator, of plates on the pivot, friction surfaces on the inner faces of the plates contacting with the opposite sides of the arm, a removable housing for the plates, and spring means contacting the housing and urging the friction surfaces toward each other.

2. The combination with a cultivator and a shield therefor having an offset arm which is pivotally connected to the beam of the cultivator, of a pair of plates on said pivot, friction strips on the inner faces of the plates, a substantially U-shaped clip on the pivot disposed over the plates and beam, and an adjustable spring on the pivot contacting with the clip.

In testimony whereof we affix our signatures.

LEE ROY TEAGUE.
JAMES GRAYBILL.